United States Patent
Gupta et al.

(10) Patent No.: US 8,891,441 B2
(45) Date of Patent: Nov. 18, 2014

(54) L2 TUNNELING-BASED LOW LATENCY SINGLE RADIO HANDOFFS

(75) Inventors: Vivek Gupta, Milpitas, CA (US); Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 782 days.

(21) Appl. No.: 12/204,075

(22) Filed: Sep. 4, 2008

(65) Prior Publication Data
US 2010/0054207 A1    Mar. 4, 2010

(51) Int. Cl.
*H04W 4/00* (2009.01)
*H04W 36/00* (2009.01)
*H04W 36/14* (2009.01)

(52) U.S. Cl.
CPC .......... *H04W 36/0011* (2013.01); *H04W 36/14* (2013.01)
USPC ............................ 370/328; 370/338; 370/352

(58) Field of Classification Search
None
See application file for complete search history.

(56) References Cited

U.S. PATENT DOCUMENTS

| | | | |
|---|---|---|---|
| 2003/0021256 A1* | 1/2003 | Lee | 370/342 |
| 2007/0254663 A1* | 11/2007 | Fiat | 455/436 |
| 2008/0165740 A1* | 7/2008 | Bachmann et al. | 370/332 |
| 2010/0309881 A1* | 12/2010 | Kim et al. | 370/331 |
| 2011/0063997 A1* | 3/2011 | Gras et al. | 370/254 |

OTHER PUBLICATIONS

3GPP Organizational Partners, "Improved Network Controlled Mobility Between E-UTRAN and 3GPP2/Mobile WiMAX Radio Technologies", 3GPP TR 36.928, 2007, 36 pages, V0.4.1, 3GPP, France.

* cited by examiner

*Primary Examiner* — Andrew Lai
*Assistant Examiner* — Leon Andrews
(74) *Attorney, Agent, or Firm* — Cool Patent, P.C.

(57) ABSTRACT

An example of this invention provides low latency handovers between Mobile WiMAX and 2G/3G/LTE networks with only a single radio transmitting at any given point in time, by establishing L2 tunnel between 3GPP MME and WiMAX ASN for control plane signaling to perform pre-registration, pre-authentication and context transfer to the target network, while UE maintains its connection to the source network, and by setting up bearer path for packet forwarding between Servicing Gateway and WiMAX ASN. An example of this invention uses a virtual eNB to facilitate low latency L2 handoffs to legacy 2G/3G networks with minimum impact to SGSN and MME.

28 Claims, 6 Drawing Sheets

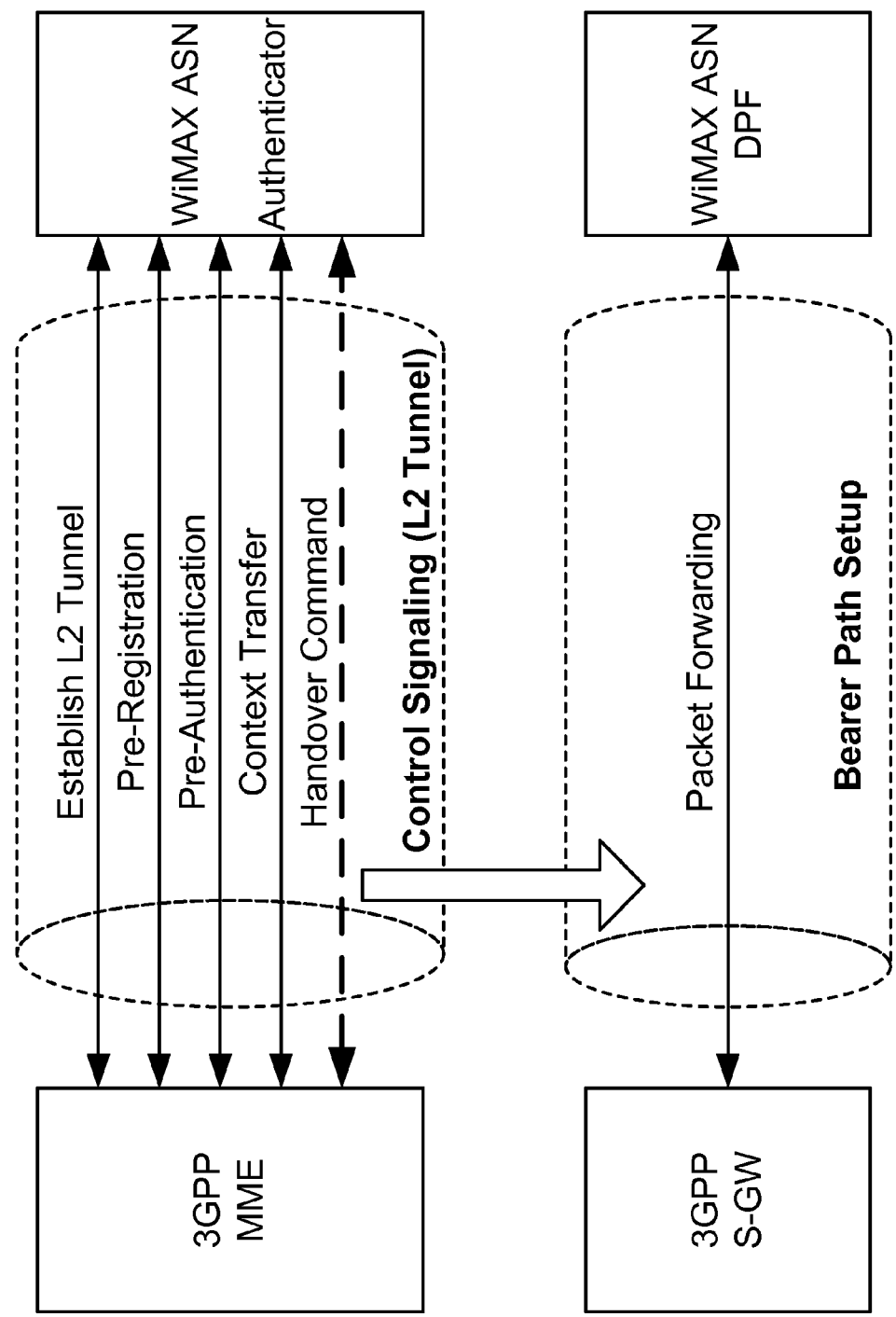

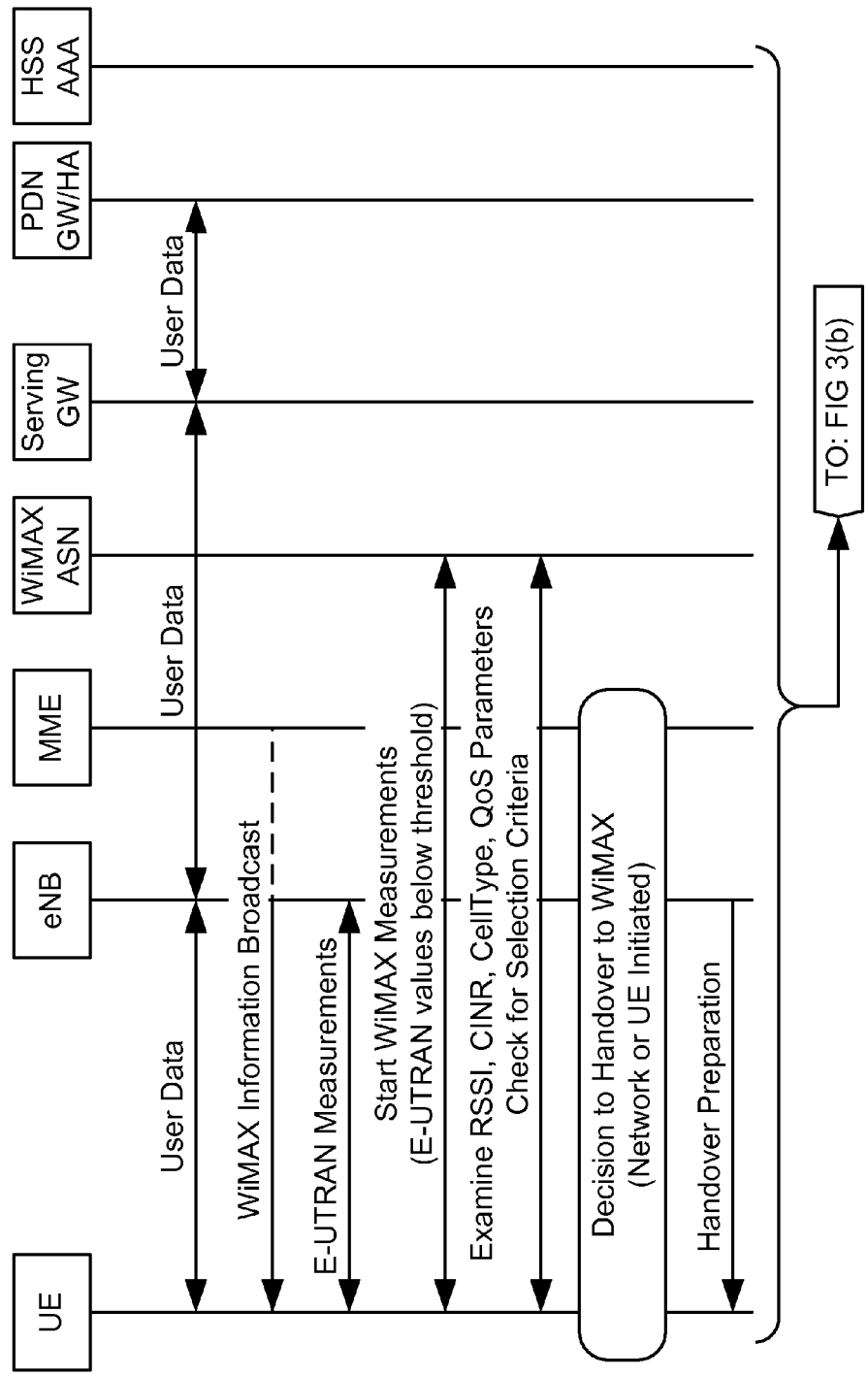

L2 TUNNELING-BASED LOW LATENCY SINGLE RADIO HANDOFFS

BACKGROUND OF THE INVENTION

Mobile-service providers already possess and operate several heterogeneous access technologies and networks. The mixed-networks environments are expected to become more prevalent as different radio technologies best serve different deployment types and environments. For example, Wi-Fi™ has shown to be a great technology for indoor operation, whereas cellular technologies, such as 2G/3G ($2^{nd}$ Generation/$3^{rd}$ Generation) and WiMAX (Worldwide Interoperability for Microwave Access) operate best in licensed spectrum covering large outdoor environments. It is also expected that multi-mode wireless devices shall become widespread. Hence, it is of great interest to the mobile operators, technology users, and vendors to provide seamless mobility between these heterogeneous access technologies with uninterrupted service continuity.

The current technologies have focused on pure layer 3 (L3) mobility solutions, such as Mobile IP (Internet Protocol). Although, these technologies support an inter-access mobility solution, the handoff delay could be extremely high. Furthermore, such L3 mobility procedures rely completely on the mobile device to make a handoff decision. These solutions rely on dual-radio operation, i.e., both the radios involved in handover would be transmitting at the same time. This, however, may not always be possible, because due to interference, platform noise and/or co-existence issues, we might only have a single radio operating at any point in time.

This disclosure proposes an alternative architecture to support a Single-Radio Handover solution leading to tighter handover control and synchronization and overall lower latency of handovers and packet loss.

BRIEF DESCRIPTION OF THE DRAWINGS

FIG. 2 shows a high-level flow in Control Plane and Data Path setup Signaling between 3GPP and WiMAX networks, utilized by an embodiment of this invention.

DETAILED DESCRIPTION OF THE PREFERRED EMBODIMENTS

An embodiment of this invention uses an alternative architecture to for single-radio handover between two wireless networks, such as WiMAX and 2G/3G/4G. This embodiment uses a Data Link Layer (L2) tunneling between the source/target and core (e.g., evolved packet core) networks to achieve a tighter handover control and synchronization, support for network initiated handoffs based on operator policy and Radio resource management (RRM), and overall lower latency of handovers and packet loss.

Figure 1:
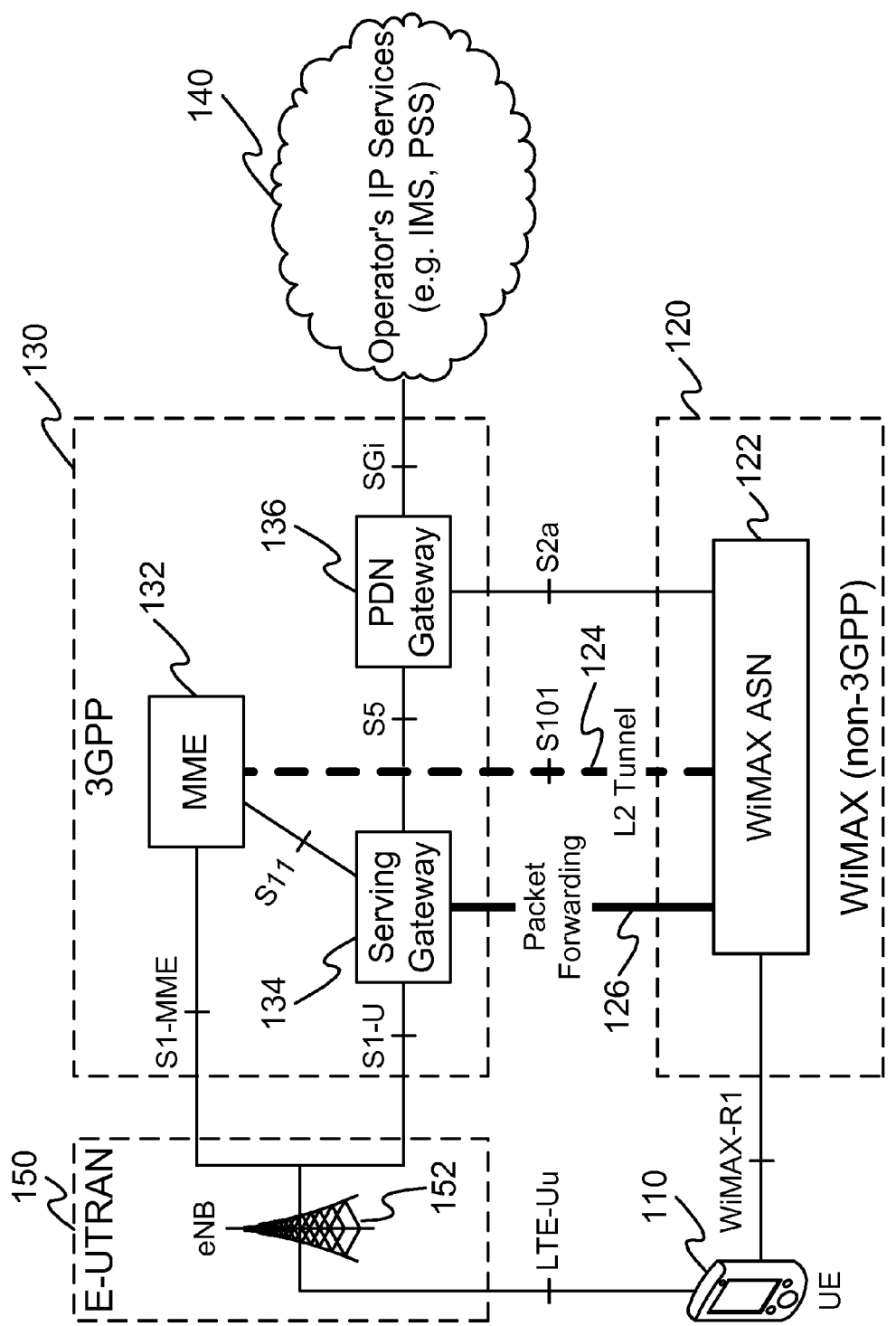
FIG. 1 shows an example of architecture for optimized single-radio handover using L2 tunneling between WiMAX and 3GPP networks, utilized in an embodiment of this invention.

In an embodiment of this invention, (referring to FIG. 1), a user equipment (UE) (110), which is connected to a source wireless network, such as an E-UTRAN (evolved-universal mobile telecommunication system (UMTS) terrestrial radio access network) (150) via an evolved-node B (eNB) (152), is handed over to a target wireless network, such as WiMAX (120). At the completion of the handover, UE will be able to communicate with an operator's IP services (140) (such as IP Multimedia Subsystem (IMS) and Packet Switch Service (PSS)) through a WiMAX Access Service Network (ASN) (122) and a Packet Data Network (PDN) gateway (136) (such as one in a $3^{rd}$ Generation Partnership Project (3GPP) network (130)). In this example, prior to handover, UE (110) communicates with the operator's IP services (140) though eNB (152), a Serving Gateway (S-GW) (134) in 3GPP (130) network, and the PDN Gateway (136).

To achieve this handover, in an embodiment, the WiMAX ASN (122) and a Mobility Management Entity (MME) (132) in the 3GPP core network (130) establish an L2 tunnel (124) to exchange control signals, such as pre-registration, pre-authentication, context transfer, and handover command, while UE (110) is still connected to the E-UTRAN (150). In an embodiment of this invention, a bearer path (126) is also set up between the WiMAX ASN (122) and the Serving Gateway (134) to use for data packet forwarding between the 3GPP and WiMAX networks. In one embodiment, the forwarded packets sent via this bearer path (126), e.g., from/to 3GPP network to/from WiMAX network, reduces the amount of re-transmission of the data packets, while UE (110) hands over the connection from the source to target network.

In an embodiment of this invention, the handover latency between the source and target networks is reduced by establishing the required control signaling before the actual handover of the data connection through the L2 tunnel connection.

A high-level flow (FIG. 2) used in an embodiment of this invention demonstrates the examples of one or more control signaling, such as Pre-Registration, Pre-Authentication, Context Transfer, and Handover Command, that are transmitted through L2 tunnel between a core network and a target network (or a source network), such as 3GPP and WiMAX networks, through networks elements, such as a 3GPP MME in 3GPP network and a WiMAX ASN Authenticator in WiMAX network. In one embodiment, one or more of such control signals are associated with the Control Plane.

An embodiment of this invention uses packet forwarding between a core network and a target network, such as 3GPP and WiMAX networks (e.g., see the packet forwarding flow illustrated in FIG. 2). In an embodiment, the data packets are forwarded between network elements, such as a 3GPP Serving Gateway and WiMAX ASN Data Packet Forwarding (DPF), after a handover event occurs (e.g., when WiMAX ASN sends a Handover Command (response)). In one embodiment, the packet forwarding occurs through a bearer-path setup during the control signaling.

Figure 3B:
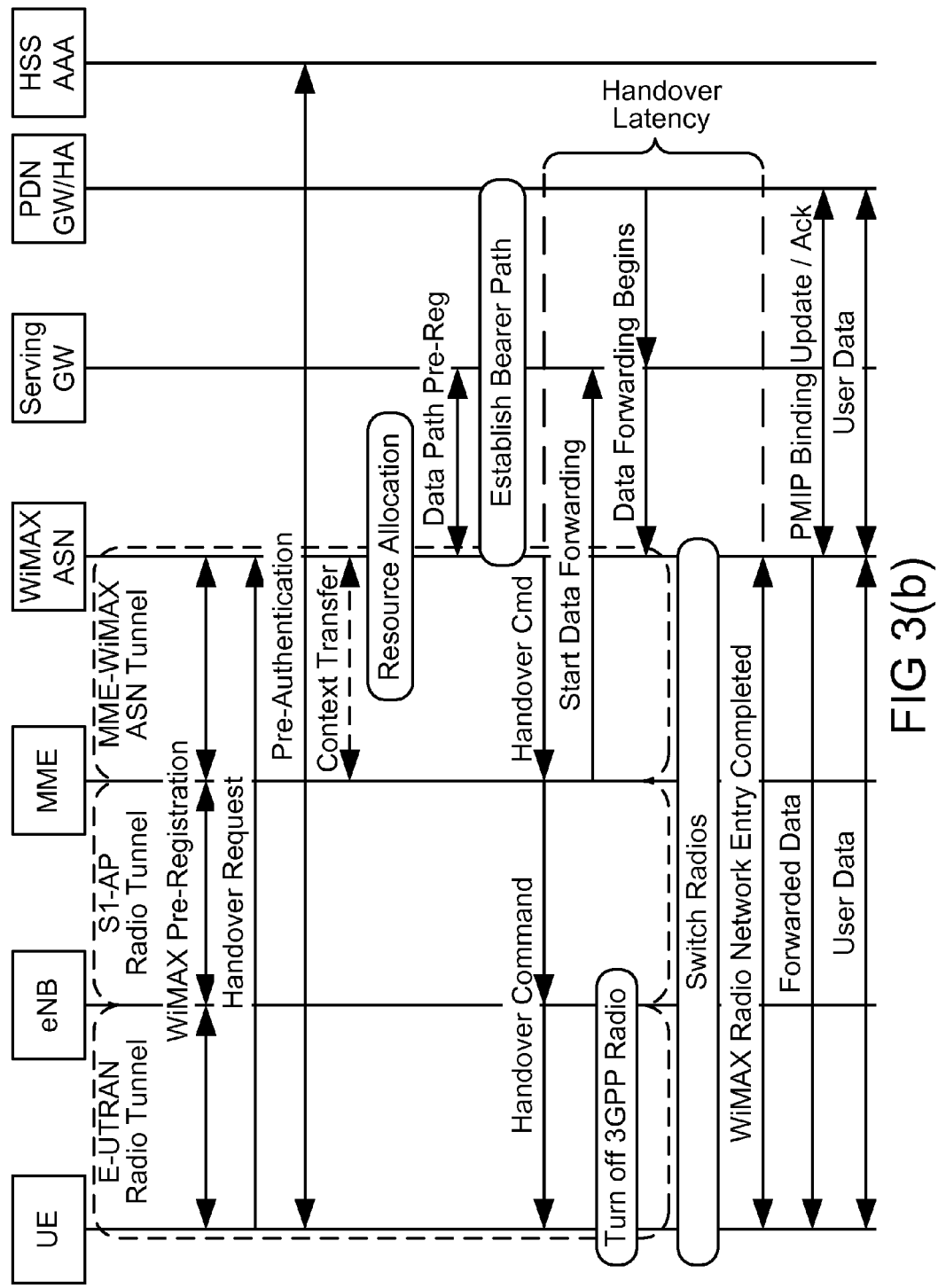
FIGS. 3(a) and (b) show the detailed low latency handover flow from E-UTRAN to WiMAX networks, based on L2 tunneling between WiMAX and 3GPP, utilized by an embodiment of this invention.

FIGS. 3(a) and (b) illustrate an example of a handover flow used in an embodiment of this invention using a Long-Term Evolution (LTE) access network, e.g., E-UTRAN, as the source network and WiMAX as the target network through 3GPP System Architecture Evolution (SAE) network. Prior to the handover, UE communicates to an IP cloud (IP services) via PDN Gateway/Home Agent (GW/HA). The user data flow between UE and PDN GW/HA through eNB (in E-UTRAN) and Serving Gateway (in 3GPP).

In one embodiment, one or more WiMAX system information elements are broadcast to UE from eNB or MEE (FIG. 3(a)). In an alternate embodiment, UE obtains target-network information (e.g., for WiMAX neighboring cells) in one or more ways, such as cached information, pulled or pushed information from services, such as network access provider, network-service provider operator, an operator's IP service, or any other service, from target network directly, or directly or indirectly from a "peer" UE. In one embodiment, the examples of one or more types of information obtained about a target network, such as WiMAX are shown in Table 1.

In one embodiment, UE measures the radio parameter in a source network (e.g., E-UTRAN), and provides the source network (e.g., eNB) such measurement.

In one embodiment, UE starts measuring target-network radio parameters, e.g., when the source network (e.g., E-UTRAN) parameter values fall below threshold, or alternatively, when UE receives a message from source network (e.g., eNB) to start radio measurement in target network. For example, in one embodiment, UE uses short occasional gaps in communications in E-UTRAN to temporarily turn off 3GPP radio (e.g., ~10 msec) and perform measurement in WiMAX network with WiMAX ASN. In one embodiment, parameters such as Received Signal Strength Indication (RSSI), Carrier to Interference-plus-Noise Ratio (CINR), Cell Type, Quality of Service (QoS) Parameters are examined and a selection criteria is checked.

In one embodiment, the decision to handover to target network (e.g., WiMAX) is network initiated, e.g., based on operator policy, or Radio Resource Management (RRM). In an alternate embodiment, the decision to handover is determined by UE. In one embodiment, a source network element, e.g., eNB (in source network, such as E-UTRAN), sends a handover preparation message to UE. In an alternate embodiment, such message is initiated by MME or other network elements. In an alternate embodiment, handover preparation is self-initiated by UE.

In one embodiment, an L2 tunnel is established between the core and the target (or source) network elements, e.g., between MME in 3GPP and WiMAX ASN, and UE communicates with one or more target network elements through this L2 tunnel. In one embodiment, this L2 tunnel is reused by the source/target networks for multiple handover events. In one embodiment, communication between UE and the target network element, such as WiMAX ASN, is supported via tunneling in source network (e.g., via a E-UTRAN radio tunnel between UE and eNB, and a tunnel between eNB and MME), in addition to L2 tunnel between core network and target network (e.g., MME in 3GPP and WiMAX ASN).

In an embodiment, UE performs registration with target network through L2 tunnel, e.g., in one embodiment, UE performs WiMAX Registration with WiMAX ASN. In one embodiment, UE and the target network element (e.g., WiMAX ASN) communicate messages (e.g., Handover request/response) through L2 tunnel.

In one embodiment, UE and an authentication/authorization service, such as HSS/AAA (Home Subscriber Server/ Authentication, Authorization and Accounting AAA) perform a security action, such as pre-authentication, through L2 tunnel.

In one embodiment, context information is passed to target network, e.g., WiMAX ASN, to support handover. Examples of context information include: information to establish types of connection (e.g., voice, bursty), security attributes, MAC context, Proxy Mobile IP (PMIP) context, and other context information communicated via Feature Profile Types (FPTs).

In one embodiment, target network, e.g., WiMAX ASN, performs resource allocation/reservation for UE to support the UE handover.

In one embodiment, a target network element (e.g., WiMAX ASN) and source network element (e.g., Serving Gateway in 3GPP) setup a bearer path to forward packets to/from UE.

In one embodiment, target network, e.g., WiMAX ASN, sends Handover Command (or a Handover response) to UE, through L2 tunnel. In one embodiment, target network (e.g., WiMAX ASN) notifies core network (e.g., MME) of Handover command through L2 tunnel. Alternatively, UE notifies core network of Handover completion.

In one embodiment, a core network element (e.g., MME in 3GPP) sends a message to a core network gateway (e.g., Serving Gateway in 3GPP) to start forwarding data packets to target network through a bearer path. In one embodiment, after establishing the bearer path, Serving Gateway determines when UE has moved to target Radio Access Technology (RAT) based on HARQ/ARQ retransmissions (e.g., within 50 msec), in order to commence forwarding packets to target network through the bearer path.

In one embodiment, having received the handover command (response), UE switches its radio to target network, and completes network entry to target network.

Handover latency is the duration between UE receiving Handover command and UE completing target network entry.

In one embodiment, UE receives forwarded user data sent to target network via the bearer path.

In one embodiment, target network (e.g., WiMAX ASN) sends PMI Binding Update message to PDN Gateway/HA to receive the data for UE. At the completion of the handover, UE user data flows through target network (e.g., WiMAX ASN) and PDN Gateway.

In one embodiment of this invention (referring to FIG. 4), a user equipment (UE) (410), which is connected to a source wireless network, such as an WiMAX (420) via WiMAX ASN (422), is handed over to a target wireless network, such as UTRAN (460) (or GERAN (470)). At the completion of the handover, UE will be able to communicate with an operator's IP services (440) through a 2G/3G network access, e.g., Serving GPRS Support Node (SGSN) (466), Serving Gateway (434), and a PDN gateway (436).

One embodiment uses a virtual eNB (438) in 3GPP network. In one embodiment, the virtual eNB has a Radio Network Controller (RNC) like functionality to allow UTRAN (460) (or GERAN (470)) to take advantage of low-latency L2 handoffs with little impact to legacy 2G/3G networks, SGSN or MME.

In one embodiment, the control signaling to handover from source network (e.g., WiMAX) to target network (e.g., UTRAN or GERAN) is performed through an L2 tunnel (424) between source network (e.g., WiMAX ASN (422)) and 3GPP MME (432). In one embodiment, a bearer data path (426) is established for data packet forwarding between source network, e.g., WiMAX, and Serving Gateway (434) to pass the data packet during the handover.

In one embodiment, UE performs an attach procedure with MME in 3GPP through L2 tunnel from source network (e.g., WiMAX), without leaving source network. In one embodiment, the resources in target network are setup through SGSN (466).

Figure 5:
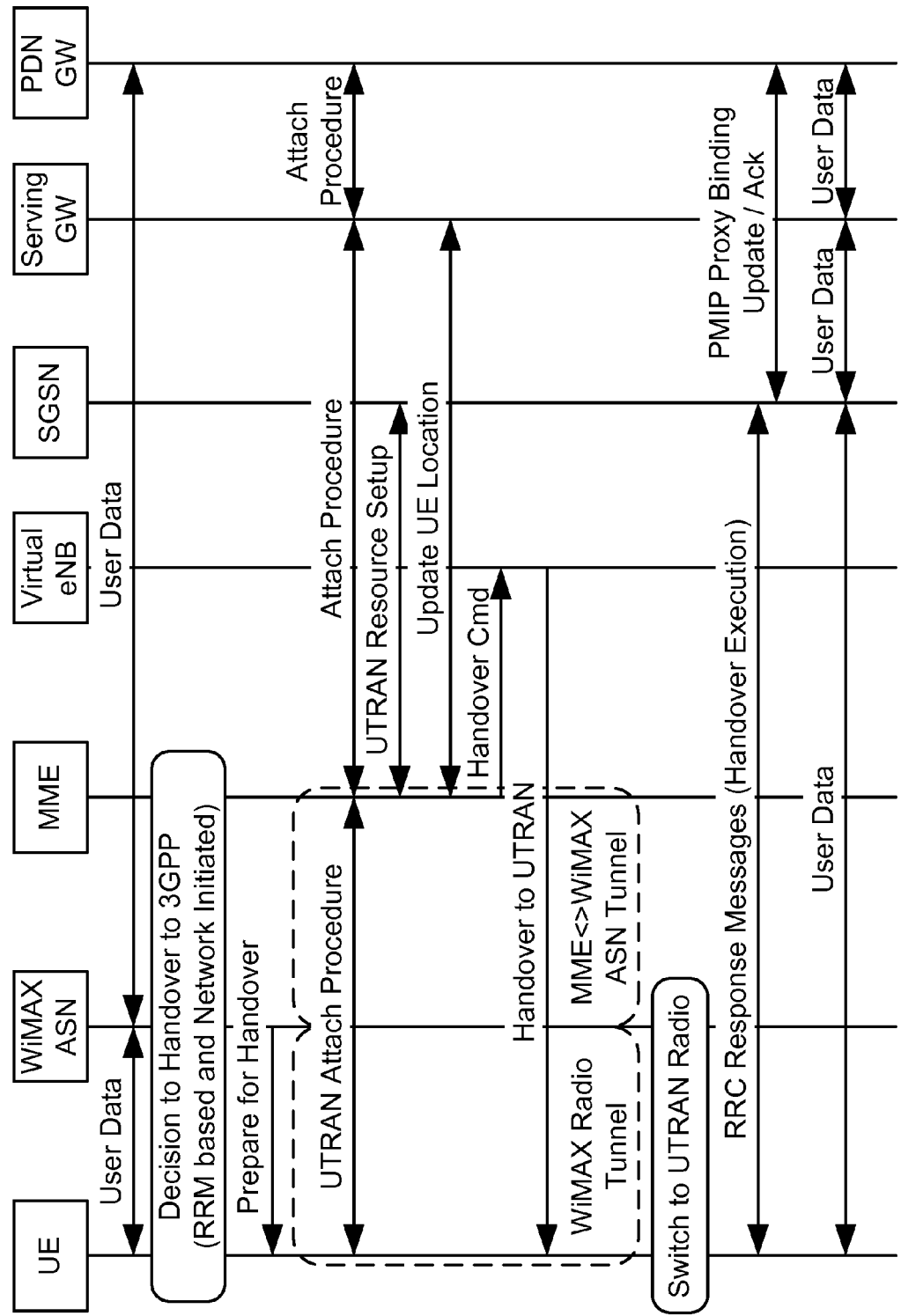
FIG. 5 shows the low-latency handover flow from WiMAX to legacy 2G/3G networks based on L2 tunneling between WiMAX and 3GPP, utilized by an embodiment of this invention.

FIG. 5 illustrate an example of a handover flow (e.g., through SAE network) used in an embodiment of this invention using WiMAX as the source network and UTRAN as the target network. Prior to the handover, UE communicates to an IP cloud via PDN Gateway and WiMAX ASN.

In one embodiment, the decision to handover from source network (e.g., WiMAX) to target network (e.g., UTRAN (460) or GERAN (470)) is network initiated (e.g., based on network RRM and measurement of radio parameters in source and/or target network).

In one embodiment, source network (e.g., WiMAX ASN) sends UE a message to prepare for handover. In an alternate embodiment, UE initiates the handover process.

In an embodiment, UE performs an attach procedure (e.g., UTRAN attach procedure) with MME, Serving Gateway, and PDN gateway in 3GPP via an L2 tunnel established between source network (e.g., WiMAX ASN) and 3GPP MME and a tunnel within source network (e.g., WiMAX radio tunnel).

In one embodiment, MME sends resource setup request to the target access network (e.g., SGSN) to allocate resource for UE handover.

In one embodiment, MME sends an update message to Serving Gateway to update the location of UE.

In one embodiment, MME sends a Handover command to a virtual eNB which sends the Handover to UTRAN to UE via L2 tunnel to source network.

In one embodiment, source network (e.g., WiMAX ASN) and core network (e.g., Serving Gateway in 3GPP) elements establish a bearer path to forward packets to/from UE during handover.

In one embodiment, UE switches its radio to target network (e.g., UTRAN), and completes handover with target network access (e.g., SGSN), e.g., via Radio Resource Control (RRC) response message. In one embodiment, SGSN sends PMIP Proxy Binding Update to PDN Gateway. At this point, user data flows from UE through target network (e.g., in case of UTRAN (460), through NodeB (464) and RNC (462); or in case of GERAN (470), through Base Station Subsystem (BSS), including Base Transceiver System (BTS) (474) and Packet Control Unit/Base Station Controller (PCU/BSC) (472)), 2G/3G network access (e.g., SGSN), 3GPP Serving Gateway, and PDN Gateway.

Figure 4:
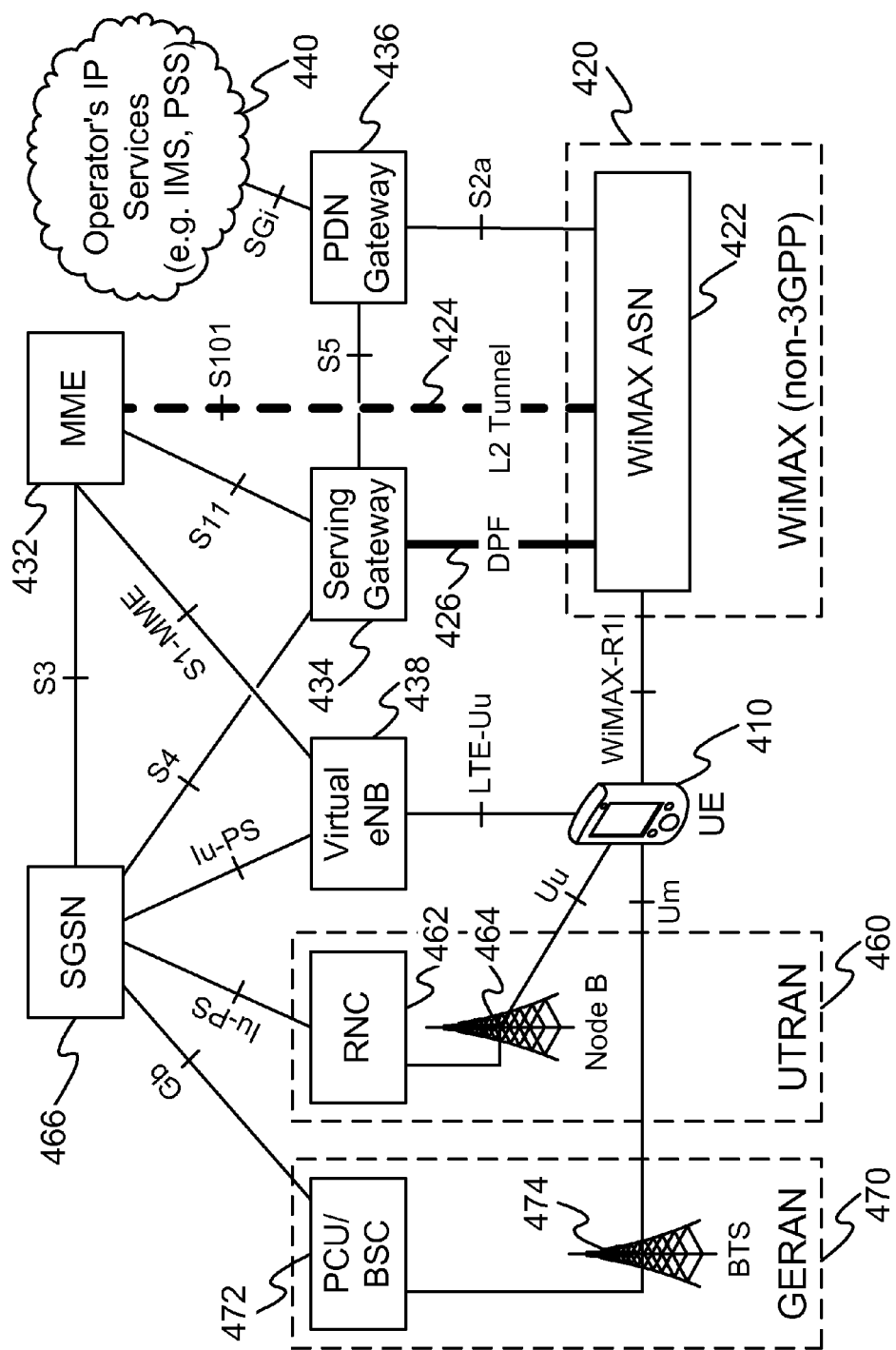
FIG. 4 shows an example of architecture for optimized single-radio handover using L2 tunneling between WiMAX and legacy 2G/3G networks (via 3GPP), utilized in an embodiment of this invention.

In one embodiment of this invention, UE is handover from WiMAX network to E-UTRAN, through similar steps as shown in FIG. 5, and in similar architecture as shown in FIG. 4. The E-UTRAN resource allocation message is, however, sent from MME to an eNB in E-UTRAN network, and UE upon receiving handover command, switches radio to E-UTRAN with Serving Gateway performing PMIP Binding Update with PDN Gateway for user data flow commence between UE and PDN Gateway through eNB (in E-UTRAN) and 3GPP Serving Gateway.

TABLE 1

Examples of WiMAX System Information obtained by a UE (e.g., via broadcast at source network(s) such as E-URAN/UTRAN)

| Type | Description |
|---|---|
| Downlink (DL) center carrier frequency | Identifies the DL center carrier frequency of WiMAX neighboring cells. In one example, DL center carrier frequency is a multiple of 250 kHz. |
| Cell bandwidth | Identifies the size of cell bandwidth. |
| Preamble index | Identifies the PHY-specific preamble for the WiMAX neighboring based station (BS). |
| BS ID | Base Station ID is a global unique identifier for a WiMAX base station, as defined in the IEEE Std 802.16-2004 and IEEE Std 802.16e-2005 standard. The BS ID represents a logical instance of a PHY and MAC function providing 802.16 radio connectivity services to an mobile station (MS)/subscriber station (SS) (equivalent to a single frequency sector of a physical base station). |
| NAP ID | NAP (Network Access Provider) is a business entity that provides WiMAX radio access infrastructure to one or more WiMAX Network Service Providers (NSPs). A NAP implements this infrastructure using one or more Access Service Networks (ASNs). NAP ID is contained in the upper 24 bits of BS ID. |
| NSP ID | NSP (Network Service Provider) is a business entity that provides IP connectivity and WiMAX services to WiMAX subscribers compliant with the Service Level Agreement it establishes with WiMAX subscribers. To provide these services, an NSP establishes contractual agreements with one or more NAPs. Additionally, an NSP may also establish roaming agreements with other NSPs and contractual agreements with third-party application providers (e.g. ASP or ISPs) for providing WiMAX services to subscribers. |
| MAC Version | MAC Version specifies the version of IEEE 802.16 for BS/MS. |
| System Version | This indicates the Mobile WiMAX release as specified by the WiMAX Forum Mobile Air Interface System Profile. |
| Available downlink (DL) Radio Resources | This indicates the average ratio of non-assigned DL radio resources to the total usable DL radio resources. The average ratio shall be calculated over a time interval defined by the DL_radio_resources_window_size parameter. The reported average ratio will serve as a relative load indicator. |
| Available uplink (UL) Radio Resources | This indicates the average ratio of non-assigned UL radio resources to the total usable UL radio resources. The average ratio shall be calculated over a time interval defined by the UL_radio_resources_window_size parameter. The reported average ratio will serve as a relative load indicator. |
| Cell Type | This specifies the cell size for hierarchical cell architecture. A lower value of "Cell Type" can represent a smaller value for cell size and a higher value of "Cell Type" can represent larger cell size. Based on the frequency of handovers, decision can be made to move to a larger cell (in case of high handover frequency) or to a smaller cell (in case of low handover frequency). |

TABLE 1-continued

Examples of WiMAX System Information obtained by a UE (e.g., via broadcast at source network(s) such as E-URAN/UTRAN)

| Type | Description |
|---|---|
| Optimized Handover Support | This flag specifies if optimized handover is supported by the 3GPP system. |
| Address of Interworking Function (IWF) | This specifies the address of the inter-working function entity that may be used in optimized handovers. |

In one embodiment, target network (e.g., WiMAX) system information is broadcast in source access network e.g., 2G/3G/4G networks or Wi-Fi™ network, to facilitate network discovery and selection.

One embodiment of this invention achieves low-latency handoffs between access networks with no need for simultaneous radio operation to reduce or eliminate issues related to co-existence and/or platform interference.

In one embodiment, a low-latency L2 tunnel is established between core network and target (or source) access network, e.g., between 3GPP MME and WiMAX ASN, for control plane signaling.

One embodiment of this invention reduces inter-RAT handoff delays as the context and security parameters are transferred through networks in the preparation phase. In one embodiment, pre-registration, pre-authentication and context transfer to the target network is performed while UE is connected to source access network and maintains connections over the source access network.

In one embodiment, a bearer path is setup between core network and target (or source) network, e.g., between 3GPP Serving Gateway and WiMAX ASN data packet forwarding function. In one embodiment, once the handover command is sent, packet forwarding happens with lower latency leading to a much smoother handoff than with an L3 tunnel. In this embodiment, through L2 tunneling, the source is informed of final tunneled message (e.g., Handover Command) that the UE is moving to target RAT and/or the core network determines UE leaving the source network based on HARQ/ARQ retransmissions, e.g., within about 50 msec. Thus, in one embodiment, packet forwarding to target network commences within about 50 msec, whereas for L3 tunnel this could take about 1 second to detect.

In an embodiment of this invention, a virtual eNB (equivalent to RNC like functionality) allows UTRAN/GERAN networks to take advantage of low-latency L2 handoffs with minimum impact to legacy 2G/3G networks (with minimal impact to SGSN and MME).

An embodiment of this invention uses low-latency handovers between Mobile WiMAX and 2G/3G/LTE with a single radio transmitting at UE at any given point of time. One embodiment of this invention uses access independent network interfaces with L2 tunneling and single-radio handover.

In an embodiment of this invention, UE is implemented in a (embedded or not-embedded) mobile device, e.g., a communication processor. In an embodiment of this invention, UE is implemented in products, such as multi-mode radio product, laptop, mobile intelligent device, personal digital assistant, or mobile phone.

The embodiments above are provided to illustrate the invention. Other radio access networks, as source or target, are considered part of this invention. Examples of such radio networks include WiMAX, 2G/3G/LTE, GERAN, UTRAN, E-UTRAN, and Wi-Fi.

Any variations of the above teachings are also intended to be covered by this patent application.

The invention claimed is:

1. A method for inter-network single-radio handover, said method comprising:
    exchanging control data between a user equipment and a target radio network through a data link layer tunnel established directly between a mobility management entity in a core network and an access services network of said target radio network, the core network comprising a source radio network, and the target radio network being different from the core network and from the source radio network;
    switching a radio from the source radio network to said target radio network; and
    receiving forwarded packets sent through a bearer data path established directly between a serving gateway of said core network and the access services network of said target radio network.

2. A method for inter-network single-radio handover, said method comprising:
    establishing a data link layer tunnel directly between a mobility management entity in a core network and an access services network of a target radio network for exchanging control data between said target radio network and user equipment connected to the core network through a source radio network, the core network comprising the source radio network, and the target radio network being different from the core network and from the source radio network; and
    establishing a bearer data path to forward packets directly between a serving gateway of said core network and the access services network of said target radio network.

3. A method for inter-network single-radio handover, said method comprising:
    establishing a data link layer tunnel directly between a mobility management entity in a core network and an access services network of a target radio network for exchanging control data between said target radio network and a user equipment connected to the core network through a source radio network, the core network comprising the source radio network, and the target radio network being different from the core network and from the source radio network;
    establishing a bearer data path to forward packets directly between a serving gateway of said core network and the access services network of said target radio network; and
    establishing a proxy mobile internet protocol (mobile-IP) binding between a packet data network gateway and a network access element for said target radio network.

4. A method for inter-network single-radio handover, said method comprising:
- establishing a data link layer tunnel directly between a mobility management entity in a core network and an access services network of a source radio network for exchanging control data between said core network and a user equipment connected to said source radio network, the core network comprising a target radio network, and the source radio network being different from the core network and from the target radio network;
- establishing a bearer data path to forward packets directly between a serving gateway of said core network and the access services network of the target radio network
- sending a handover message to said user equipment by a virtual node in said core network; and
- establishing a proxy mobile internet protocol (mobile-IP) binding between a packet data network gateway and a network access element for the target radio network.

5. The method as recited in claim 1, said method further comprising: measuring radio parameters in said target radio network by said radio.

6. The method as recited in claim 5, said method further comprising: receiving a handover preparation command.

7. The method as recited in claim 1, wherein said control data comprises pre-registration communication.

8. The method as recited in claim 1, wherein said control data comprises an attach procedure.

9. The method as recited in claim 1, wherein said core network is a Third Generation Partnership Project (3GPP) evolved packet core.

10. The method as recited in claim 1, wherein said target radio network is one of the following: Worldwide Interoperability for Microwave Access (WiMAX), evolved-universal mobile telecommunication system (UMTS) terrestrial radio access network (E-UTRAN), Long-Term Evolution (LTE), or Wi-Fi; and
- wherein said source radio network is one of the following: WiMAX, E-UTRAN, LTE, Global System for Mobile Communications (GSM) Enhanced Data rates for GSM Evolution (EDGE) Radio Access Network (GERAN), universal mobile telecommunication system (UMTS) terrestrial radio access network (UTRAN), or Wi-Fi.

11. The method as recited in claim 2, said method further comprising: transferring context to said target radio network through said data link layer tunnel.

12. The method as recited in claim 2, said method further comprising: initiating data forwarding after a handover command is received or issued by said core network.

13. The method as recited in claim 2, said method further comprising: deciding to handover to said target radio network based on one or more selection criteria.

14. The method as recited in claim 2, wherein said core network is a Third Generation Partnership Project (3GPP) evolved packet core.

15. The method as recited in claim 2, wherein said target radio network is one of the following: Worldwide Interoperability for Microwave Access (WiMAX), evolved-universal mobile telecommunication system (UMTS) terrestrial radio access network (E-UTRAN), Long-Term Evolution (LTE), or Wi-Fi; and
- wherein said source radio network is one of the following: WiMAX, E-UTRAN, LTE, Global System for Mobile Communications (GSM) Enhanced Data rates for GSM Evolution (EDGE) Radio Access Network (GERAN), universal mobile telecommunication system (UMTS) terrestrial radio access network (UTRAN), or Wi-Fi.

16. The method as recited in claim 3, said method further comprising: starting data forwarding after a handover event or hybrid automatic repeat request/automatic repeat request (HARQ/ARQ) retransmissions.

17. The method as recited in claim 3, wherein said control data comprises pre-registration communication.

18. The method as recited in claim 3, said method further comprising: forwarding data to said user equipment after completion of said user equipment entry in said target radio network.

19. The method as recited in claim 3, wherein said core network is a Third Generation Partnership Project (3GPP) evolved packet core.

20. The method as recited in claim 3, wherein said target radio network is one of the following: Worldwide Interoperability for Microwave Access (WiMAX), evolved-universal mobile telecommunication system (UMTS) terrestrial radio access network (E-UTRAN), Long-Term Evolution (LTE), or Wi-Fi; and
- wherein said source radio network is one of the following: WiMAX, E-UTRAN, LTE, Global System for Mobile Communications (GSM) Enhanced Data rates for GSM Evolution (EDGE) Radio Access Network (GERAN), universal mobile telecommunication system (UMTS) terrestrial radio access network (UTRAN), or Wi-Fi.

21. The method as recited in claim 4, said method further comprising: sending an update message to the serving gateway in said core network to update a location of said user equipment.

22. The method as recited in claim 4, wherein said virtual node in said core network is a virtual evolved-node B (eNB).

23. The method as recited in claim 4, said method further comprising: sending a handover command from said mobility management entity to said virtual node.

24. The method as recited in claim 4, wherein said control data comprises an attach procedure.

25. The method as recited in claim 4, said method further comprising: requesting said target radio network to allocate resources to handover said user equipment.

26. The method as recited in claim 25, wherein said mobility management entity sends a request to allocate said resources to a Serving General packet radio service (GPRS) Support Node (SGSN).

27. The method as recited in claim 4, wherein said core network is a Third Generation Partnership Project (3GPP) evolved packet core.

28. The method as recited in claim 4, wherein said target radio network is one of the following: Global System for Mobile Communications (GSM) Enhanced Data rates for GSM Evolution (EDGE) Radio Access Network (GERAN)—or—universal mobile telecommunication system (UMTS) terrestrial radio access network (UTRAN); and
- wherein said source radio network is one of the following: Worldwide Interoperability for Microwave Access (WiMAX), evolved-universal mobile telecommunication system (UMTS) terrestrial radio access network (E-UTRAN), Long-Term Evolution (LTE) GERAN, UTRAN, or Wi-Fi.

* * * * *